(12) United States Patent
Ishiyama

(10) Patent No.: US 10,921,290 B2
(45) Date of Patent: Feb. 16, 2021

(54) LASER ULTRASONIC TESTING

(71) Applicant: HITACHI, LTD., Tokyo (JP)

(72) Inventor: Kazuo Ishiyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 257 days.

(21) Appl. No.: 16/178,263

(22) Filed: Nov. 1, 2018

(65) Prior Publication Data
US 2019/0187103 A1 Jun. 20, 2019

(30) Foreign Application Priority Data

Dec. 15, 2017 (JP) .................. 2017-240100

(51) Int. Cl.
*G01N 29/24* (2006.01)
*G01N 29/04* (2006.01)
*G01N 29/34* (2006.01)
*G01H 9/00* (2006.01)

(52) U.S. Cl.
CPC ........... *G01N 29/2418* (2013.01); *G01H 9/00* (2013.01); *G01H 9/008* (2013.01); *G01N 29/041* (2013.01); *G01N 29/343* (2013.01); *G01N 2291/104* (2013.01)

(58) Field of Classification Search
CPC ............. G01N 29/2418; G01N 29/041; G01N 29/343; G01N 2291/104; G01H 9/00; G01H 9/008

See application file for complete search history.

(56) References Cited

U.S. PATENT DOCUMENTS

2012/0304774 A1* 12/2012 Ishioka .............. G01N 29/2418
73/643

FOREIGN PATENT DOCUMENTS

| JP | 2003-215110 A | 7/2003 | |
| WO | WO-2008106199 A1 * | 9/2008 | ......... G01N 21/1717 |
| WO | WO-2014149213 A1 * | 9/2014 | ......... G01N 21/1702 |

* cited by examiner

*Primary Examiner* — Ryan D Walsh
(74) *Attorney, Agent, or Firm* — Volpe Koenig

(57) ABSTRACT

Laser ultrasonic testing includes a laser apparatus; a splitting unit that splits a pulsed laser from the laser apparatus into first and second lasers; a first pulse width conversion unit that converts a pulse width of the first laser; a first optical system that guides the first laser having the converted pulse width to a test object; a second pulse width conversion unit that converts a pulse width of the second laser; a pulse propagation time adjustment unit that adjusts a propagation time of the second laser having the converted pulse width; a second optical system that guides the second laser having the converted pulse width and adjusted propagation time to the test object; and a detection unit that detects a surface displacement change of the test object caused by an ultrasonic wave generated by the first laser when the second laser is reflected by the test object.

10 Claims, 6 Drawing Sheets

LASER ULTRASONIC TESTING

BACKGROUND OF THE INVENTION

1. Field of the Invention

The present invention relates to laser ultrasonic testing.

2. Description of the Related Art

Laser ultrasonic testing includes an ultrasonic excitation unit using a laser and an ultrasonic detection unit using a laser.

Ultrasonic excitation using a laser is performed by irradiating a test object with a temporally pulse-like laser beam (laser for excitation). When the power density of the laser beam is small, a thermal stress is generated in the process of rapid heating and rapid cooling in a small area on a surface, and the generated thermal stress causes distortion of a material, thereby generating an ultrasonic signal (thermoelastic mode). On the other hand, when the power density of the laser beam is large, the surface layer of the test object is converted into plasma and a pressure is applied to the test object as a reaction of plasma expansion, thereby generating vibrations (ablation mode).

The reception of ultrasonic waves using a laser is performed by measuring a surface displacement caused by ultrasonic waves excited in the mode by using a laser displacement meter. As methods to achieve this, a method based on a laser interferometer such as a Michelson interferometer, a Fabry-Perot interferometer, or an interferometer using phase conjugate optical elements, and a method based on a knife-edge type such as a Speckle Knife Edge Detector (hereinafter referred to as SKED) have been proposed. Among these methods, the Fabry-Perot interferometer, the phase conjugate optical elements interferometer, and the SKED are applicable to rough surfaces. The use of these receivers makes it possible to implement practical laser ultrasonic testing.

A measurement using a laser ultrasonic method generally requires two laser apparatuses, i.e., a laser apparatus for ultrasonic excitation and a laser apparatus for a receiver. As the laser apparatus for ultrasonic excitation, a pulse laser apparatus having a pulse width of nanosecond order or less and having a high peak power is required. As the laser apparatus for a receiver, a continuous wave (CW) laser apparatus or a pulse laser apparatus having a pulse width of microsecond order or longer is required. Accordingly, laser ultrasonic testing of the related art requires the two types of laser apparatuses with different specifications. This causes problems such as an increase in costs and troublesome maintenance and adjustment for the laser apparatuses.

JP 2003-215110 A is a related art in the field of the present invention. JP 2003-215110 A discloses laser ultrasonic testing using one laser apparatus and a laser ultrasonic wave testing method. Specifically, JP 2003-215110 A discloses a technique in which a laser beam from a laser apparatus for excitation is split into two beams, and the pulse width of one of the beams is expanded and used as a laser beam for a receiver.

SUMMARY OF THE INVENTION

In JP 2003-215110 A, only the dispersion of an optical fiber is used as means for expanding the pulse width and the required length of the optical fiber is extremely long. This causes a problem that the cost of the optical fiber is higher than the cost of one laser apparatus for a receiver.

The present invention has been made in view of the above-described problems, and an object of the present invention is to provide practical low-cost laser ultrasonic testing using one laser apparatus.

In view of the above-described related art and problems, an aspect of the present invention is laser ultrasonic testing including a laser apparatus; a splitting unit configured to split a pulsed laser beam from the laser apparatus into a first laser beam and a second laser beam; a first pulse width conversion unit configured to convert a pulse width of the first laser beam; a first optical system configured to guide the first laser beam to a test object, the pulse width of the first laser beam being converted by the first pulse width conversion unit; a second pulse width conversion unit configured to convert a pulse width of the second laser beam; a pulse propagation time adjustment unit configured to adjust a propagation time of the second laser beam, the pulse width of the second laser beam being adjusted by the second pulse width conversion unit; a second optical system configured to guide the second laser beam to the test object, the pulse width of the second laser beam being converted, the propagation time of the second laser beam being adjusted; and a detection unit configured to detect a change of a surface displacement of the test object, the change of the surface displacement being caused by an ultrasonic wave generated by the first laser beam when the second laser beam is reflected by the test object.

According to the present invention, it is possible to obtain low-cost laser ultrasonic testing using one laser apparatus.

DESCRIPTION OF THE PREFERRED EMBODIMENTS

Embodiments of the present invention will be described below with reference to the drawings.

First Embodiment

Figure 1:
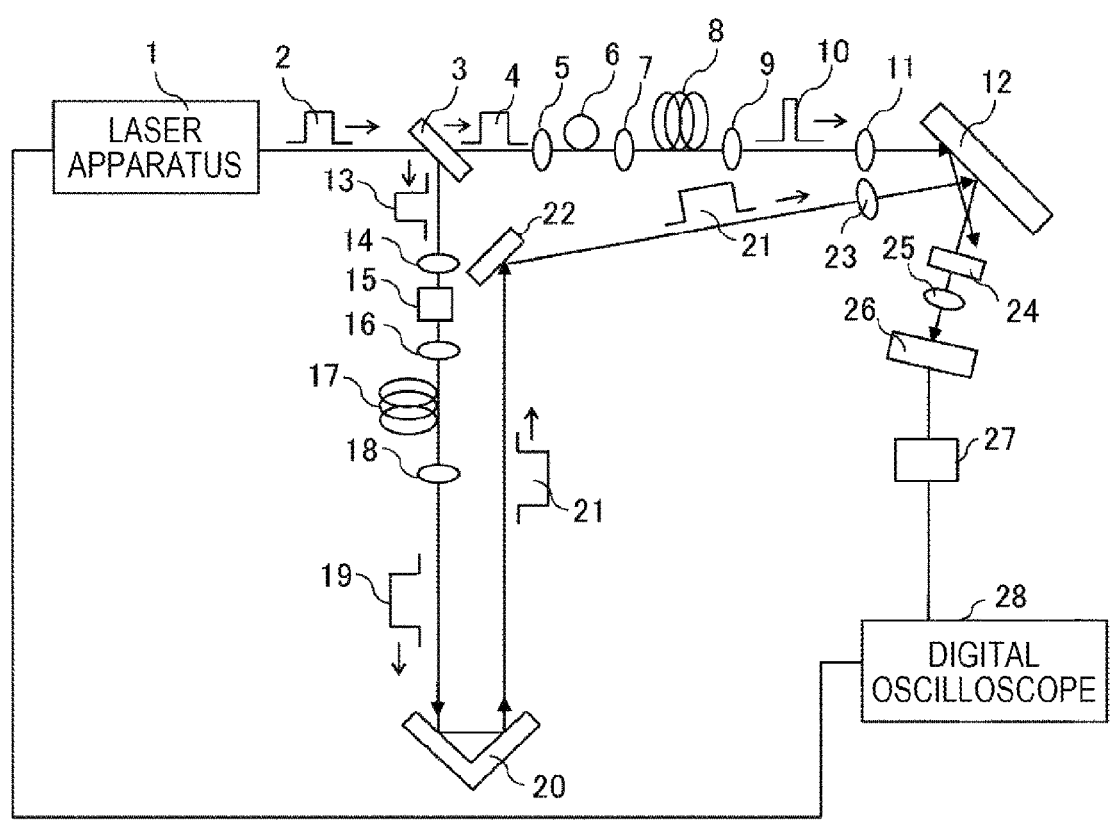
FIG. 1 illustrates laser ultrasonic testing according to a first embodiment.

FIG. 1 is a configuration diagram illustrating laser ultrasonic testing according to a first example. Referring to FIG. 1, laser ultrasonic testing includes a laser apparatus 1 that generates a pulsed laser, a laser beam splitter 3 that splits a pulsed laser beam 2 output from the laser apparatus 1 into a first laser beam 4 and a second laser beam 13, a focus lens 5 that focuses the first laser beam 4 on a spectrum width expansion optical fiber 6, a focus lens 7 that focuses the laser beam output from the spectrum width expansion optical fiber 6 on a first pulse width conversion optical fiber 8, a collimator lens 9 that collimates the laser beam output from the first pulse width conversion optical fiber 8, and a focus lens 11 that focuses a collimated laser beam 10 on the surface of a test object 12. Further, the laser ultrasonic testing includes a focus lens 14 that focuses the second laser beam 13 split by the laser beam splitter 3 on a wavelength conversion crystal 15, a focus lens 16 that condenses light on a second pulse width conversion optical fiber 17, a collimator lens 18 that collimates the laser beam output from the second pulse width conversion optical fiber 17, a laser beam delay circuit 20 that adjusts a time for the collimated second laser beam 19 to reach the test object 12, a mirror 22 that guides the second laser beam 19 to the test object 12, and a focus lens 23 that condenses the second laser beam 21 on the surface of the test object 12. Furthermore, the laser ultrasonic testing includes an optical filter 24 that selectively transmits the reflected light of the second laser beam 21 by the test object 12, a focus lens 25 that focuses the light transmitted through the optical filter on a knife-edge-type detector (SKED) 26, an electric amplifier 27 that amplifies an electric signal from the knife-edge-type detector 26, and a digital oscilloscope 28 that displays the amplified electric signal.

In the case of generating and receiving MHz-order ultrasonic waves, a laser for excitation and a laser for a receiver require pulse widths of tens of nanoseconds and microseconds or more, respectively. In the first embodiment, the pulse width of the laser apparatus 1 is set to an intermediate pulse width between the pulse widths required for the laser for excitation and the laser for reception. For example, if the pulse width is set to hundreds of nanoseconds, it is necessary to compress the pulse width of a first laser beam to about one-tenth the pulse width and to expand the pulse width of a second laser beam to several times the pulse width. Specifically, for example, the wavelength 1064 nm of a YAG laser that is most frequently used is used.

To compress the pulse width of the first laser beam to one-tenth the original wave width, the following method is considered. That is, a spectrum is first expanded to 10 times the original spectrum and then a wavelength dispersion compensation is performed to thereby compress the pulse width to one-tenth the original pulse width. The dispersion (chromatic dispersion) described herein refers to a phenomenon in which the propagation time of light varies depending on the wavelength. The dispersion includes a positive dispersion and a negative dispersion. In the positive dispersion, a long wave component advances rapidly and a short wave component advances slowly. The negative dispersion has characteristics opposite to those of the positive dispersion. The use of this phenomenon makes it possible to reduce or increase the pulse width. For example, if wavelength components constituting a light pulse propagate at the same velocity, the pulse width is increase in both the positive dispersion and the negative dispersion. If the long wave component advances more rapidly than the short wave component, the pulse width is increased in the positive dispersion and the pulse width is reduced in the negative dispersion. If the short wave component advances more rapidly than the long wave component, the pulse width is reduced in the positive dispersion and the pulse width is increased in the negative dispersion. A high non-linear optical fiber, a photonic crystal fiber, or the like may be used as spectrum width expansion optical fiber 6 serving as a spectrum width expansion member. The use of the non-linear optical phenomenon such as self-phase modulation, cross-phase modulation, four-wave-mixing spectroscopy, or Raman scattering makes it possible to expand the spectrum width (super continuum phenomena). Further, an optical fiber having a chromatic dispersion with a sign necessary for dispersion compensation is required as the first pulse width conversion optical fiber 8.

As for the second laser beam, a second harmonic is generated using the wavelength conversion crystal 15 serving as a wavelength conversion member such as $KTiOPO_4$ (KTP) crystal, thereby converting the wavelength from 1064 nm to 532 nm. Next, the pulse width is expanded to several times the original pulse width by dispersion of the optical fiber using the second pulse width conversion optical fiber 17. By converting the wavelength into a short wavelength, the amount of dispersion of the optical fiber can be one to two orders of magnitude greater and the length of the optical fiber can be one to two orders of magnitude shorter. For example, the amount of dispersion of the optical fiber is about 10 ps/nm/km at a wavelength of 1064 nm, and is 1000 ps/nm/km or more at a wave length of 532 nm. To expand the pulse width to a pulse width of microseconds, an optical fiber with a length of several hundred km is required.

By converting the wavelength of the second laser beam, the reflected light that is obtained by reflecting the first laser beam on the test object and causes noise in a received signal can be suppressed using the optical filter 24.

The laser beam delay circuit 20 adjusts the optical path length of the second laser beam 13 by multiple reflection to cause the second laser beam 13 to be irradiated onto the test object 12 at the same timing when the ultrasonic wave generated by the first laser beam 4 reaches a reception point, or slightly before the timing.

As described above, according to the first embodiment, a laser beam from a single laser apparatus is split into two laser beams, and the pulse widths of the laser beams are converted by a pulse width compression and pulse width expansion unit so that the laser beams are used as a laser beam for excitation and a laser beam for detection, respectively. Then, the laser beams are irradiated onto a test object, so that the knife-edge-type detector 26 serving as a detection unit detects a change of a surface displacement on the test object. Consequently, since this configuration can be obtained using one laser apparatus, it is possible to obtain low-cost laser ultrasonic testing that facilitates maintenance and adjustment for the laser apparatus.

Second Embodiment

Figure 2:
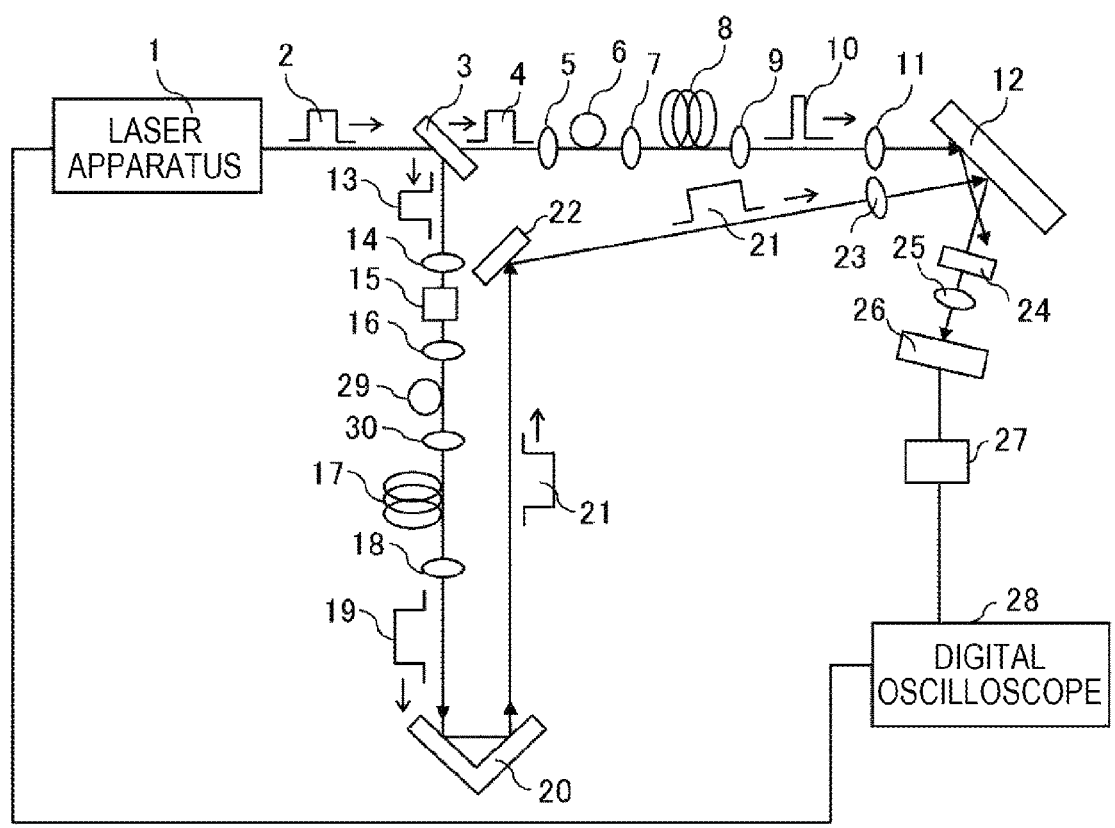
FIG. 2 illustrates laser ultrasonic testing according to a second embodiment.

FIG. 2 is a configuration diagram illustrating laser ultrasonic testing according to a second embodiment. In FIG. 2, the same components as those illustrated in FIG. 1 are denoted by the same reference numerals, and descriptions thereof are omitted. FIG. 2 differs from FIG. 1 in that a spectrum width expansion optical fiber 29 and a focus lens 30 that condenses light on the second pulse width conversion optical fiber 17 are provided.

The spectrum width of the second pulse is expanded by the spectrum width expansion optical fiber 29 serving as a spectrum width expansion member, thereby making it possible to increase the expansion of the pulse width in the second pulse width conversion optical fiber 17. A high non-linear optical fiber or a photonic crystal fiber may be used as the spectrum width expansion optical fiber 29. By expanding the spectrum width from 1 nm to 100 nm by using the Super Continuum phenomenon described in the first embodiment, thereby making it possible to reduce the length of the optical fiber to $1/100$. Specifically, for example, by adding the expansion of the spectrum width to the configuration according to the first embodiment, the length of the optical fiber can be reduced from several hundred km to several km.

As described above, according to the second embodiment, it is possible to provide laser ultrasonic testing at a lower cost.

Third Embodiment

Figure 3:
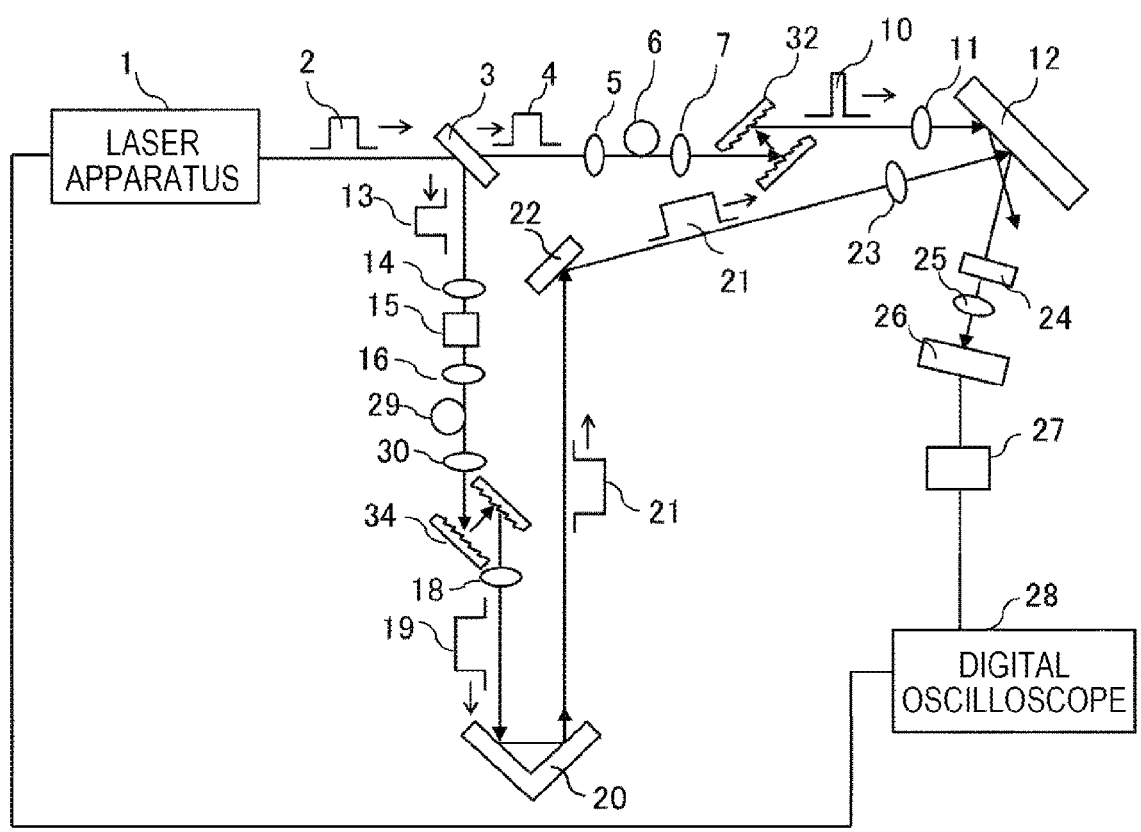
FIG. 3 illustrates laser ultrasonic testing according to a third embodiment.

FIG. 3 is a configuration diagram illustrating laser ultrasonic testing according to a third embodiment. In FIG. 3, the same components as those illustrated in FIG. 2 are denoted by the same reference numerals, and descriptions thereof are omitted. FIG. 3 differs from FIG. 2 in that grating pairs 32 and 34 are used instead of the first pulse width conversion optical fiber 8 and the second pulse width conversion optical fiber 17, respectively.

By adjusting an interval between the grating pairs, the amount of dispersion necessary for pulse width compression or pulse width expansion can be adjusted.

While a set of grating pair is used in the third embodiment, a plurality of grating pairs may be used, or grating pairs may be used in combination with a pulse conversion optical fiber so as to obtain a desired amount of dispersion. Further, grating pairs may be applied to the configuration according to the first embodiment.

Fourth Embodiment

Figure 4:
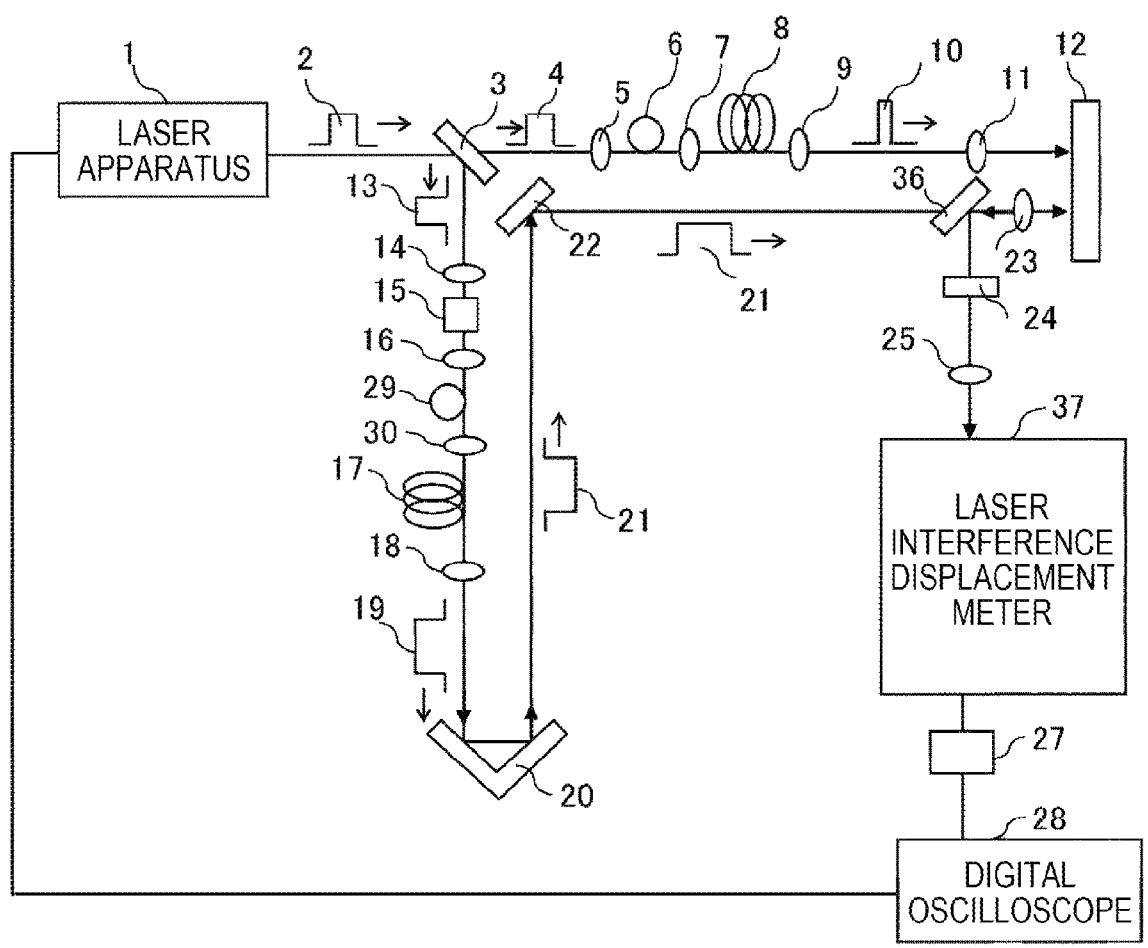
FIG. 4 illustrates laser ultrasonic testing according to a fourth embodiment.

FIG. 4 is a configuration diagram illustrating laser ultrasonic testing according to a fourth embodiment. In FIG. 4, the same components as those illustrated in FIG. 2 are denoted by the same reference numerals, and descriptions thereof are omitted. FIG. 4 differs from FIG. 2 in that a beam splitter 36 is provided between the mirror 22 and the focus lens 23. The beam splitter 36 transmits the second laser beam 21 from the mirror 22, condenses the transmitted second laser beam 21 on the surface of the test object 12 through the focus lens 23, and reflects the reflected light of the second laser beam 21 that is incident through the focus lens 23 and reflected by the test object 12, thereby guiding the laser beam to the optical filter 24.

Further, FIG. 4 differs from FIG. 2 in that the light transmitted through the optical filter 24 is condensed on a laser interference displacement meter 37 through the focus lens 25. In this case, a Fabry-Perot interferometer or a laser interferometer using a phase conjugate optical element may be used as the laser interference displacement meter 37.

Although the fourth embodiment is described on the basis of the second embodiment, the fourth embodiment may be applied to the first embodiment or the third embodiment.

Fifth Embodiment

A fifth embodiment illustrates a case where laser ultrasonic testing uses a laser ultrasonic flaw detection equipment for detecting a flaw.

Figure 5:
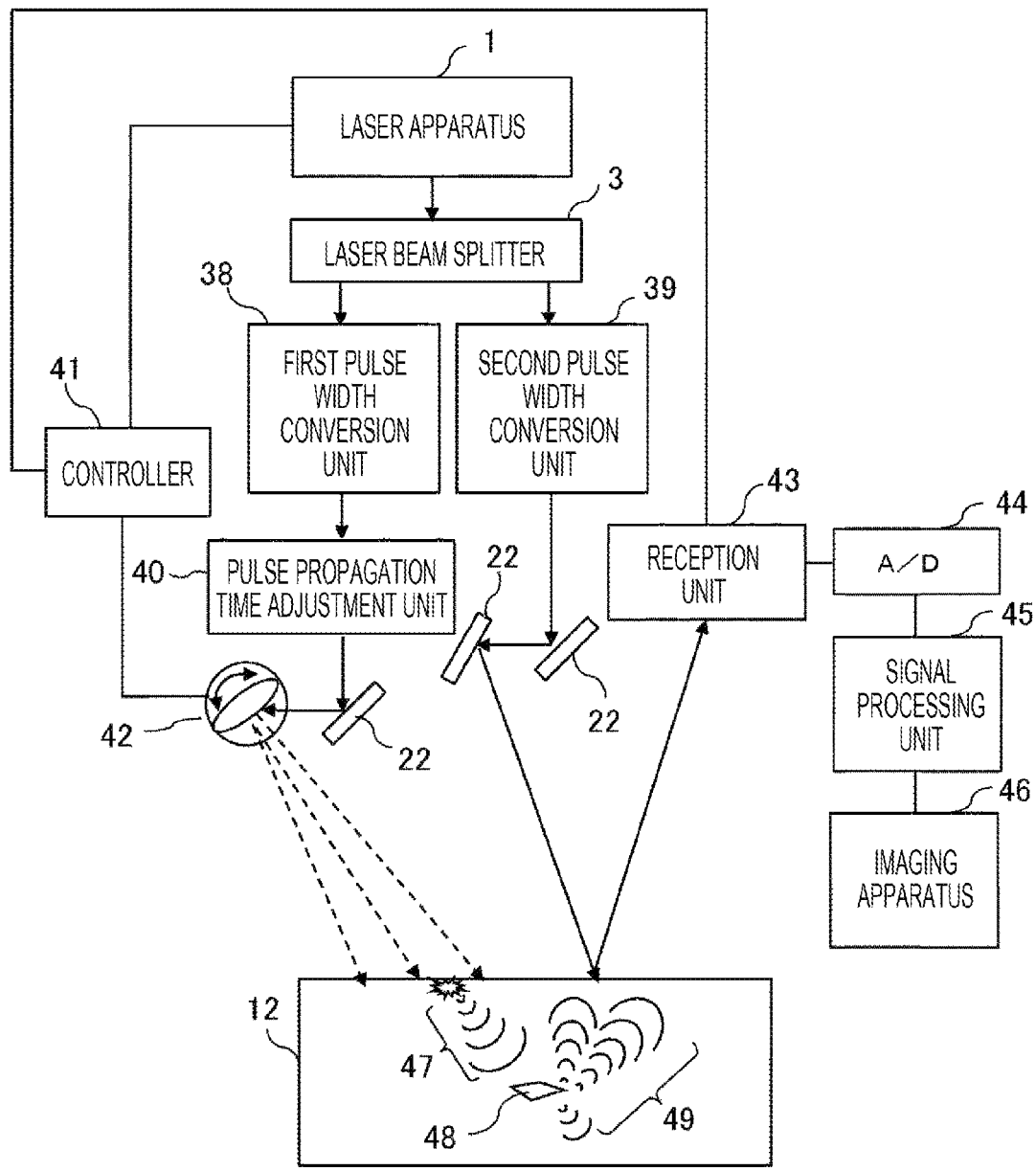
FIG. 5 illustrates laser ultrasonic testing according to a fifth embodiment.

FIG. 5 is a block diagram of a laser ultrasonic testing according to this embodiment. In FIG. 5, the same components as those illustrated in FIG. 1 are denoted by the same reference numerals, and descriptions thereof are omitted.

In FIG. 5, a first pulse width conversion unit 38 is a first pulse width conversion unit that converts the pulse width of the first laser beam obtained in such a manner that the laser beam output from the laser apparatus 1 is split by the laser beam splitter 3. The first pulse width conversion unit 38 corresponds to the first pulse width conversion optical fiber 8 illustrated in FIG. 1, or the grating pair 32 illustrated in FIG. 3. The first pulse width conversion unit 38 may include the spectrum width expansion optical fiber 6.

Further, a second pulse width conversion unit 39 is a second pulse width conversion unit that converts the pulse width of the second laser beam split by the laser beam splitter 3. The second pulse width conversion unit 39 corresponds to the second pulse width conversion optical fiber 17 illustrated in FIG. 1, or the grating pair 34 illustrated in FIG. 3. The second pulse width conversion unit 39 may include the wavelength conversion crystal 15 illustrated in FIG. 1, or the spectrum width expansion optical fiber 29 illustrated in FIG. 2.

A pulse propagation time adjustment unit 40 is a pulse propagation time adjustment unit that adjusts the propagation time of the first laser beam. The pulse propagation time adjustment unit 40 corresponds to the laser beam delay circuit illustrated in FIG. 1. In FIG. 1, the laser beam delay circuit 20 is used to adjust the propagation time of the second laser beam. However, since the laser beam delay circuit 20 is used to adjust the second laser beam at the timing when the ultrasonic wave generated by the first laser beam reaches a reception point, a relative time between the first laser beam and the second laser beam may be adjusted, or the propagation time of the first laser beam may be adjusted.

A scanning-type mirror 42 is a scanning-type mirror that performs scanning for irradiating the test object 12 with the first laser beam, the propagation time of which is adjusted by the pulse propagation time adjustment unit 40.

The first laser beam is irradiated onto the test object 12 to generate an excited ultrasonic wave 47 on the test object 12, and if a flaw 48 is present in the test object 12, a flaw echo ultrasonic wave 49 is generated from the flaw 48.

A reception unit 43 detects the flaw echo ultrasonic wave by irradiating the second laser beam onto a surface displacement caused by the flaw echo ultrasonic wave 49. The reception unit 43 corresponds to the optical filter 24 and the knife-edge-type detector 26 illustrated in FIG. 1. Furthermore, the reception unit 43 corresponds to the optical filter 24 and the laser interference displacement meter 37 illustrated in FIG. 4.

Further, the laser ultrasonic testing includes an analog-to-digital (A/D) converter 44 that converts a signal from the reception unit 43 from an analog signal into a digital signal, a signal processing unit 45 that detects a flaw by processing the signal from the A/D converter 44, and an imaging apparatus 46 that generates a detected image based the processing result from the signal processing unit 45.

In this manner, a laser beam from a single laser apparatus is split into two laser beams, and the pulse widths of the laser beams are converted so that the laser beams are used as a laser beam for excitation and a laser beam for detection, respectively. Then, the laser beams are irradiated onto a test object to generate the ultrasonic wave 47 on the test object, and the flaw echo ultrasonic wave 49 from the internal flaw 48 is detected, thereby detecting the flaw on the surface of the test object or the flaw within the test object based on the detection result. Consequently, it is possible to obtain low-cost laser ultrasonic testing that facilitates maintenance and adjustment for the laser apparatus.

Sixth Embodiment

A sixth embodiment illustrates a case where the laser ultrasonic testing uses a laser ultrasonic evaluation apparatus that evaluates characteristics of the surface of a test object.

Figure 6:
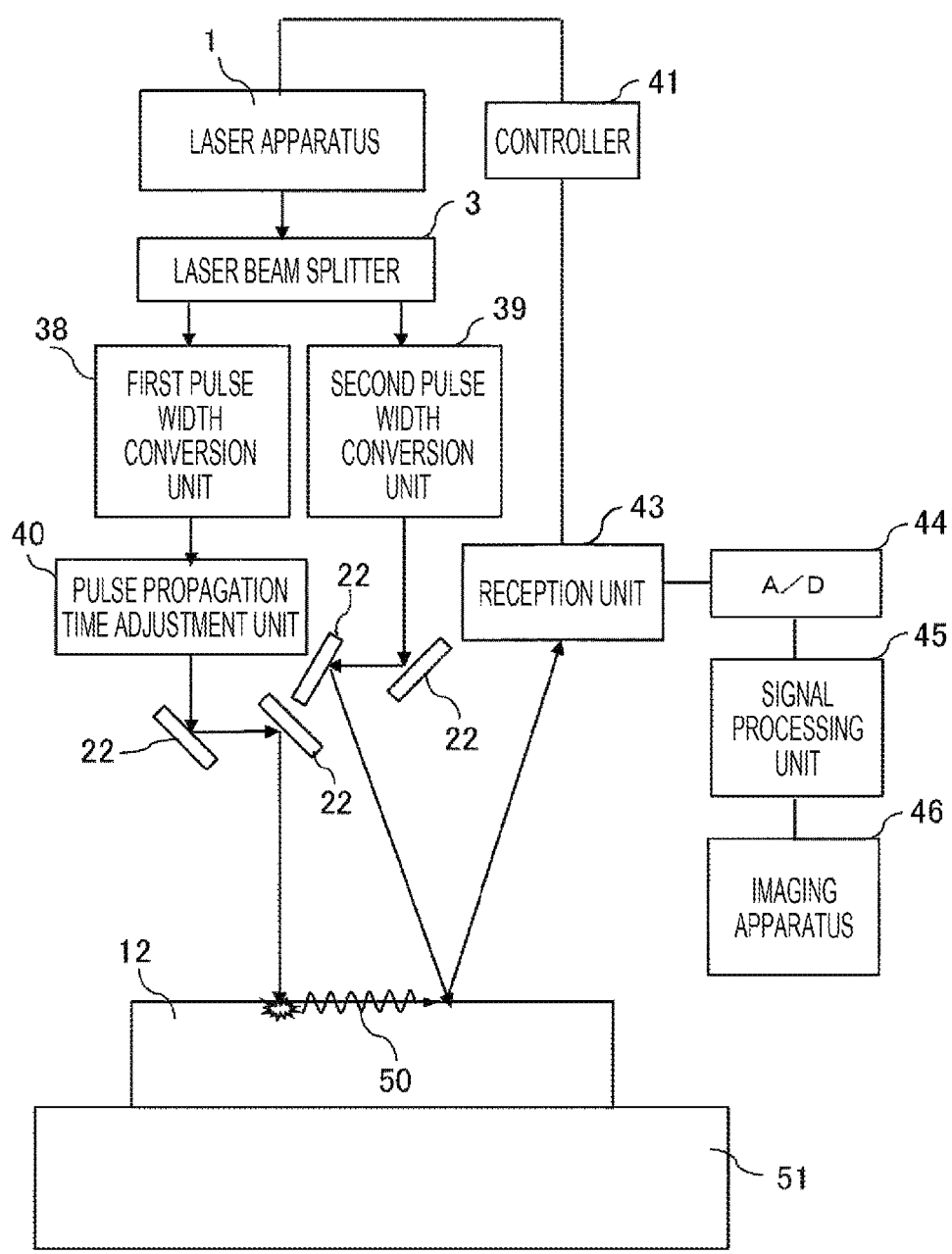
FIG. 6 illustrates laser ultrasonic testing according to a sixth embodiment.

FIG. 6 is a block configuration diagram illustrating laser ultrasonic testing according to the sixth embodiment. In FIG. 6, the same components as those illustrated in FIG. 5 are denoted by the same reference numerals, and descriptions thereof are omitted.

FIG. 6 differs from FIG. 5 in that the first laser beam, the propagation time of which is adjusted by the pulse propagation time adjustment unit 40 is irradiated onto the test object 12 placed on a movement stage 51 through the mirror 22 to generate a surface ultrasonic wave 50 on the test object 12, and the propagation velocity of the surface ultrasonic wave 50 is evaluated by the reception unit 43, the A/D converter 44, the signal processing unit 45, and the imaging apparatus 46. A measurement position can be changed by using the movement stage 51.

Consequently, according to the sixth embodiment, it is possible to evaluate characteristics of the surface of a test object.

What is claimed is:

1. A laser ultrasonic testing device comprising:
   a laser apparatus;
   a splitting unit configured to split a pulsed laser beam from the laser apparatus into a first laser beam and a second laser beam;
   a first pulse width conversion unit configured to convert a pulse width of the first laser beam;
   a first optical system configured to guide the first laser beam to a test object, the pulse width of the first laser beam being converted by the first pulse width conversion unit;
   a second pulse width conversion unit configured to convert a pulse width of the second laser beam;
   a pulse propagation time adjustment unit configured to adjust a propagation time of the second laser beam, the pulse width of the second laser beam being adjusted by the second pulse width conversion unit;
   a second optical system configured to guide the second laser beam to the test object, the pulse width of the second laser beam being converted, the propagation time of the second laser beam being adjusted;
   a detection unit configured to detect a change of a surface displacement of the test object, the change of the surface displacement being caused by an ultrasonic wave generated by the first laser beam when the second laser beam is reflected by the test object; and
   a spectrum width expansion member configured to expand a spectrum width of the first laser beam, the pulse width of the first laser beam being converted by the first pulse width conversion unit,
   wherein the pulse propagation time adjustment unit adjusts irradiation of the second laser beam onto the test object at a timing identical to a timing when the ultrasonic wave generated by the first laser beam propagates to the test object and then reaches a position where the test object is irradiated with the second laser beam.

2. The laser ultrasonic testing device according to claim 1, further comprising a wavelength conversion member configured to convert a wavelength of the second laser beam, the pulse width of the second laser beam being converted by the second pulse width conversion unit.

3. The laser ultrasonic testing device according to claim 1, further comprising a spectrum width expansion member configured to expand a spectrum width of the second laser beam, the pulse width of the second laser beam being converted by the second pulse width conversion unit.

4. The laser ultrasonic testing device according to claim 1, wherein each of the first pulse width conversion unit and the second pulse width conversion unit is an optical fiber having a predetermined length, and the first pulse width conversion unit and the second pulse width conversion unit convert the pulse widths of the first laser beam and the second laser beam, respectively, into a desired pulse width through the optical fiber by using a dispersion characteristic of the optical fiber.

5. The laser ultrasonic testing device according to claim 4, wherein the detection unit is a laser interferometer.

6. The laser ultrasonic testing device according to claim 5, wherein the first laser beam is irradiated onto the test object to generate an ultrasonic wave on the test object, while the second laser beam is irradiated onto the test object to detect reflected light, and a flaw on a surface of the test object or a flaw within the test object is detected based on a result of the detection.

7. The laser ultrasonic testing device according to claim 5, wherein the first laser beam is irradiated onto the test object to generate an ultrasonic wave on the test object, while the second laser beam is irradiated on the test object to detect reflected light, and a propagation velocity of the ultrasonic wave is evaluated based on a result of the detection to evaluate a characteristic of the surface of the test object.

8. The laser ultrasonic testing device according to claim 4, wherein the detection unit detects the change by using a knife-edge method.

9. The laser ultrasonic testing device according to claim 1, wherein the first pulse width conversion unit and the second pulse width conversion unit are a grating pair, and the first pulse width conversion unit and the second pulse width conversion unit convert the pulse widths of the first laser beam and the second laser beam, respectively, into a desired pulse width through the grating pair by using a dispersion characteristic of the grating pair.

10. The laser ultrasonic testing device according to claim 1, wherein the pulse propagation time adjustment unit multiple-reflects the second laser beam to adjust a time when the second laser beam reaches the test object.

* * * * *